United States Patent
Lee et al.

(10) Patent No.: US 9,493,649 B2
(45) Date of Patent: Nov. 15, 2016

(54) POLYCARBONATE RESIN COMPOSITION

(71) Applicant: LG CHEM, LTD., Seoul (KR)

(72) Inventors: Ryul Lee, Daejeon (KR); Su Kyoung Lee, Daejeon (KR); Min Ji Kim, Daejeon (KR); Jong Kuk Choi, Daejeon (KR); Sung Tae Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/422,968

(22) PCT Filed: Oct. 4, 2013

(86) PCT No.: PCT/KR2013/008894
§ 371 (c)(1),
(2) Date: Feb. 20, 2015

(87) PCT Pub. No.: WO2014/065519
PCT Pub. Date: May 1, 2014

(65) Prior Publication Data
US 2015/0218371 A1    Aug. 6, 2015

(30) Foreign Application Priority Data

Oct. 24, 2012  (KR) .................. 10-2012-0118423
Oct. 4, 2013   (KR) .................. 10-2013-0118346

(51) Int. Cl.
*C08K 9/00*     (2006.01)
*C08L 69/00*    (2006.01)
*C08L 23/08*    (2006.01)

(52) U.S. Cl.
CPC ............. *C08L 69/00* (2013.01); *C08L 23/08* (2013.01); *C08L 2203/20* (2013.01); *C08L 2205/03* (2013.01); *C08L 2205/16* (2013.01)

(58) Field of Classification Search
CPC ............. C08L 69/00; C08L 2207/53; C08L 2203/20; C08L 2205/03; C08L 2205/16; C08J 5/00
See application file for complete search history.

(56) References Cited

U.S. PATENT DOCUMENTS

| | | | |
|---|---|---|---|
| 5,218,037 A | 6/1993 | Orikasa et al. | |
| 5,961,915 A | 10/1999 | Toyouchi et al. | |
| 7,825,176 B2 * | 11/2010 | Kim | C08K 5/053 524/249 |
| 2002/0099136 A1 | 7/2002 | Park et al. | |
| 2005/0154148 A1 * | 7/2005 | Nakamichi | C08L 67/04 525/450 |
| 2010/0003882 A1 * | 1/2010 | Sumi | C08J 5/18 442/327 |
| 2010/0076137 A1 * | 3/2010 | Ogasawara | H01L 23/293 524/405 |
| 2011/0196097 A1 * | 8/2011 | Nomura | C08L 69/00 525/146 |

FOREIGN PATENT DOCUMENTS

| | | |
|---|---|---|
| CN | 1487976 A | 4/2004 |
| CN | 101351504 A | 1/2009 |
| CN | 101899205 | 12/2010 |
| CN | 103534312 A | 1/2014 |
| EP | 2 810 990 A1 | 12/2014 |
| JP | 11-181197 | 7/1999 |
| JP | 11-181198 A | 7/1999 |
| JP | 2001-294741 A | 10/2001 |
| JP | 2003-113300 | 4/2003 |
| JP | 2007-154093 A | 6/2007 |
| JP | 2008-255214 A | 10/2008 |
| JP | 2009-046678 A | 3/2009 |
| JP | 2010-505025 A | 2/2010 |
| JP | 2010-059316 A | 3/2010 |
| JP | 2010-126706 A | 6/2010 |
| KR | 10-2002-0042216 | 6/2002 |
| KR | 10-2002-0096150 | 12/2002 |
| KR | 10-2007-0060611 | 6/2007 |
| KR | 10-2009-0018569 | 2/2009 |
| KR | 10-2009-0052447 | 5/2009 |
| KR | 10-0903029 | 6/2009 |
| KR | 10-2010-0047234 | 5/2010 |
| KR | 10-1035116 | 5/2011 |
| TW | 201229131 | 7/2012 |
| WO | 0181470 | 11/2001 |
| WO | 03095558 | 11/2003 |

* cited by examiner

*Primary Examiner* — Hannah Pak
(74) *Attorney, Agent, or Firm* — Dentons US LLP

(57) ABSTRACT

A polycarbonate resin composition including 35 to 49% by weight of a polycarbonate resin; 41 to 55% by weight of a glass fiber having a rectangular or oval cross-sectional shape in the direction perpendicular to the longitudinal direction, in which its aspect ratio is 50 to 200; 1 to 10% by weight of an impact modifier having a core-shell structure; 1 to 10% by weight of an ethylene-(meth)acrylate-based copolymer; and 1 to 10% by weight of a rheology modifier containing a thermoplastic polyester-based polymer or a phosphate ester-based compound.

11 Claims, No Drawings

POLYCARBONATE RESIN COMPOSITION

This application is a National Stage Entry of International Application No. PCT/KR2013/008894, filed Oct. 4, 2013, and claims the benefit of Korean Application No. 10-2012-0118423 filed on Oct. 24, 2012 and Korean Application No. 10-2013-0118346, filed Oct. 4, 2013, all of which are hereby incorporated by reference in their entirety for all purposes as if fully set forth herein.

TECHNICAL FIELD

The present invention relates to a polycarbonate resin composition which has low warpage property and excellent flowability and appearance property, and exhibits more improved toughness.

BACKGROUND

A polycarbonate resin, which is a polycarbonate ester-based polymer of bisphenol A among thermoplastic resins, is known to exhibit excellent mechanical properties, impact resistance, dimensional stability, electrical properties and moldability. Further, because the polycarbonate resin is able to maintain its physical properties over a wide range of temperature, and exhibits self-extinguishing property, it is used as an engineering plastic material with a wide variety of applications.

In particular, a glass fiber-reinforced polycarbonate resin exhibits improved tensile/flexural strength, tensile/flexural modulus and heat resistance, and thus it can be properly used in the products that receive continuous load at high temperatures. However, glass fiber reinforcement may reduce impact strength, tensile elongation, toughness or the like, and also deteriorate flowability, resulting in poor moldability and processability. Additionally, the surface protrusion of glass fiber causes a surface roughness and vulnerability to an external impact during the general molding process, and thus there are many restrictions in its application to housing of various electrical•electronic products.

In order to improve flowability or the like, it has been suggested that a glass fiber reinforced polycarbonate resin composition is provided by using a low molecular weight polycarbonate resin. In this case, flowability and moldability can be improved, but impact resistance and chemical resistance can be rapidly reduced. It was also considered to use a general impact modifier having a core-shell structure together with glass fiber for the improvement of impact strength, toughness or the like. In this case, flowability and moldability are also reduced, and glass fiber breakage and resin degradation due to excessive shear occur during processing, and therefore, it is difficult to achieve impact resistance. Furthermore, there is a problem of poor surface roughness due to the surface protrusion of glass fiber.

Recently, as molded articles such as small electrical•electronic products or the like have become thinner and complicated, application of the above described conventional glass fiber-reinforced polycarbonate resin composition to the housing of these electrical•electronic products often caused flexure or deformation, or breakage during processing. The reason is likely to be a shrinkage difference between the flow direction and the direction orthogonal to the flow direction due to the glass fiber reinforcement.

SUMMARY

Accordingly, the present invention provides a polycarbonate resin composition which has low warpage property and excellent flowability and appearance properties, and exhibits more improved toughness, while having the advantages of the glass fiber reinforcement.

Further, the present invention provides a molded article including the polycarbonate resin composition.

The present invention provides a polycarbonate resin composition, including 35 to 60% by weight of a polycarbonate resin; 30 to 55% by weight of a glass fiber having a rectangular or oval cross-sectional shape in the direction perpendicular to the longitudinal direction in which its aspect ratio of the following Formula 1 is 50 to 200; 1 to 10% by weight of an impact modifier having a core-shell structure; 1 to 10% by weight of an ethylene-(meth)acrylate-based copolymer; and 1 to 10% by weight of a rheology modifier containing a phosphate ester-based compound:

$$\text{Aspect ratio } (\delta) = L/D \quad \text{[Formula 1]}$$

wherein L is the length of glass fiber, and D is the length of the longest side of the rectangular cross section or the length of the longest diameter of the oval cross section.

In the polycarbonate resin composition, the length of the glass fiber may be approximately 2 to 5 mm, and it may have a rectangular cross section, and the length of its shortest side may be approximately 5 to 15 µm. Alternatively, the length of the glass fiber may be approximately 2 to 5 mm, and it may have an oval cross section, and the length of its shortest diameter may be approximately 5 to 15 µm.

Further, the glass fiber may be those surface-coated with a silane-based compound, for example, a compound having an epoxy silane group or a urethane silane group.

In the polycarbonate resin composition, the polycarbonate resin may have melt index (MI) of approximately 10 g/10 min to 25 g/10 min, which is measured, for example, for 10 minutes at a temperature of 300° C. under a load of 1.2 kg in accordance with ASTM D1238.

In the polycarbonate resin composition, the phosphate ester-based compound included as the rheology modifier may be one or more compounds selected from the group consisting of triphenyl phosphate, bisphenol A diphenyl phosphate and resorcinol diphenyl phosphate.

In the polycarbonate resin composition, the impact modifier of a core-shell structure may include one or more selected from the group consisting of a silicone-acrylic-based rubber, a butadiene-based rubber, and an acrylic-based rubber.

Further, in the polycarbonate resin composition, the ethylene-(meth)acrylate-based copolymer may include approximately 15 to 50% by weight of a (meth)acrylate-based repeating unit, based on the total weight of the copolymer.

Meanwhile, the present invention provides a molded article including the above described polycarbonate resin composition. This molded article can be applied to housing of mobile telephones, housing of electrical•electronic products, or housing of personal digital assistants.

In the above described polycarbonate resin composition and molded article, the flat glass fiber having a relatively low aspect ratio and the predetermined rheology modifier are used together with the impact modifier having a core-shell structure and the ethylene-(meth)acrylate-based copolymer, and therefore, they have the advantages of reinforcement of the polycarbonate resin with the glass fiber, and also have low warpage property and excellent flowability, and exhibit more improved toughness, surface smoothness, appearance property, stiffness or the like.

DETAILED DESCRIPTION OF THE EMBODIMENTS

Hereinafter, the polycarbonate resin composition and the molded article according to specific embodiments of the present invention will be described in detail.

According to one embodiment of the present invention, provided is a polycarbonate resin composition including 35 to 60% by weight of a polycarbonate resin; 30 to 55% by weight of a glass fiber having a rectangular or oval cross-sectional shape in the direction perpendicular to the longitudinal direction in which its aspect ratio of the following Formula 1 is 50 to 200; 1 to 10% by weight of an impact modifier having a core-shell structure; 1 to 10% by weight of an ethylene-(meth)acrylate-based copolymer; and 1 to 10% by weight of a rheology modifier containing a phosphate ester-based compound:

$$\text{Aspect ratio } (\delta) = L/D \quad \text{[Formula 1]}$$

wherein L is the length of glass fiber, and D is the length of the longest side of the rectangular cross section or the length of the longest diameter of the oval cross section.

According to the above described one embodiment, the problems of the conventional glass fiber-reinforced polycarbonate resin composition, for example, occurrence of flexure or deformation and deterioration in surface smoothness and appearance property due to protruded glass fiber during molding of articles can be prevented. At the same time, excellent flowability and product moldability as well as high stiffness and toughness can be achieved.

The reason seems to be that the predetermined rheology modifier is used together with the flat glass fiber having a specific aspect ratio. That is, because the flat glass fiber is used, a smaller number of glass fiber than the general glass fiber with the same content can be added to the polycarbonate resin composition. Accordingly, the contact area of the polycarbonate resin with a matrix can be increased, and the rheology modifier is able to inhibit surface protrusion of the glass fiber. As a result, the polycarbonate resin composition of one embodiment, to which these two components are added, is able to exhibit excellent stiffness such as tensile strength and flexural modulus and improved toughness, compared to the conventional polycarbonate resin composition reinforced with the general glass fiber, and also, it is able to exhibit excellent flowability, moldability, processability or the like. Further, the reduction of surface smoothness due to protrusion of the glass fiber can be inhibited, thereby achieving excellent appearance property. In particular, although a higher content of the glass fiber than those known before is added to a relatively low content of the polycarbonate resin so as to further improve stiffness or the like, the problems that are generated by addition of the high content of glass fiber can be solved, and thus the polycarbonate resin composition of one embodiment is able to exhibit the above described excellent physical properties.

Therefore, the resin composition and the molded article obtained therefrom of one embodiment can be very preferably applied to housing of mobile telephones, housing of electrical•electronic products (particularly, small thin film electrical•electronic products), housing of personal digital assistants or the like, and also applied to other various products.

Hereinafter, each component of the polycarbonate resin composition of one embodiment will be described in detail.

Polycarbonate Resin

The polycarbonate resin is a polymer of bisphenol A, for example, those having melt index (MI) of approximately 10 g/10 min to 25 g/10 min which is measured for 10 minutes at a temperature of 300° C. under a load of 1.2 kg in accordance with ASTM D1238. If the melt index of the polycarbonate resin is too low, flowability of the resin composition of one embodiment and product moldability can be reduced, and if the melt index is too high, impact resistance, toughness, chemical resistance or the like of the resin composition and the molded article can be reduced.

As the polycarbonate resin, any aromatic polycarbonate-based resin satisfying the above physical properties can be used, and those directly synthesized by a method known in the art or commercially available products can be used.

The polycarbonate resin can be used in an amount of approximately 35 to 60% by weight, or approximately 35 to 49% by weight, or approximately 36 to 48% by weight, based on the total resin composition, considering the basic physical properties of the resin composition of one embodiment, for example, the polycarbonate resin-specific impact resistance, self-extinguishing property, stability, moldability or the like.

With respect to the polycarbonate resin composition of one embodiment, although a relatively low content of the polycarbonate resin is used and a higher content of the glass fiber is added thereto so as to further improve stiffness such as tensile strength or the like, the problems that are generated by addition of the high content of glass fiber can be solved, and reduction in surface smoothness and appearance property due to the protruded glass fiber during molding of the article using the resin composition can be inhibited. Therefore, in response to the recent technical demands, additional improvement of the physical properties can be achieved by addition of high content of the glass fiber. If the content of the polycarbonate resin is increased, the addition amount of the glass fiber is not sufficient, and thus it is difficult to expect desirable improvement in the physical properties such as stiffness or the like. If the content of the polycarbonate resin is excessively decreased, excessive addition amount of the glass fiber may cause protrusion of glass fiber during molding of articles, leading to deterioration in the appearance property.

Glass Fiber

The glass fiber is a component which is included in the resin composition of one embodiment in order to improve tensile/flexural strength, tensile/flexural modulus, heat resistance, or the like, and the flat glass fiber to be used may be in a cocoon- or flat-type. In particular, because the glass fiber having a relatively low aspect ratio of approximately 50 to 200, in which the aspect ratio is defined by Formula 1, is used in the resin composition of one embodiment, stiffness and toughness of the polycarbonate resin composition of one embodiment can be further improved, and its warpage property and surface smoothness is more excellent than those previously known. Specifically, this glass fiber maintains a strong binding ability between polymers, and thus space between the polymer and the glass fiber is created to absorb external impacts. Consequently, stiffness is more improved and surface smoothness is enhanced, and excellent toughness can be also achieved at the same time. Therefore, when the resin composition of one embodiment is used for plastic processing of thin film products, a hard cast must be manufactured.

When the glass fiber is cut in the direction perpendicular to the longitudinal direction, the glass fiber may have a rectangular or oval cross-sectional shape, and its aspect ratio represented by Formula 1 may be approximately 50 to 200, and more preferably, approximately 100 to 150. In the calculation of the aspect ratio, L can be defined as the longest length of the glass fiber, and D can be defined as the length of the longest side of the rectangular cross section or the length of the longest diameter of the oval cross section in any rectangular or oval cross-section of the glass fiber which is cut in the direction perpendicular to the longitudinal direction. The aspect ratio can be defined as a ratio of L to D (L/D) defined as above.

If the aspect ratio of the glass fiber is too low, it is not preferred because the resin composition and the molded article of one embodiment may become brittle. If the aspect ratio is too high, the possibility of surface protrusion of the glass fiber increases to deteriorate surface smoothness and appearance of the product, and toughness, impact strength or the like of the molded article can be also deteriorated.

In addition, a glass fiber having the length of approximately 2 to 5 mm, or approximately 3 to 4 mm, having a rectangular cross-sectional shape in the direction perpendicular to the longitudinal direction, and having the length of the shortest side of approximately 5 to 15 μm, or approximately 7 to 10 μm can be properly used. In another embodiment, a glass fiber having the length of approximately 2 to 5 mm, or approximately 3 to 4 mm, having an oval cross-sectional shape in the direction perpendicular to the longitudinal direction, and having the length of the shortest diameter of approximately 5 to 15 μm, or approximately 7 to 10 μm can be properly used.

When the glass fiber satisfying the scale requirements is used, it is possible to achieve excellent strength or the like by addition of the glass fiber, and the resin composition of one embodiment is able to exhibit excellent toughness, appearance, surface smoothness or the like.

If the length of the glass fiber is too short, it is not preferred in terms of stiffness such as strength or the like. In contrast, if the length of the glass fiber is too long, it is not preferred because generation of appearance defects increases during molding of the products.

Further, if the glass fiber has a rectangular cross-sectional shape and the length of its shortest side is too short, or if the glass fiber has an oval cross-sectional shape and the length of its shortest diameter is too short, it is not preferred because the resin composition or the molded article of one embodiment becomes brittle. In contrast, if the length of the shortest side or diameter of the cross section is too long, the molded article may have undesirable surface smoothness or appearance because of surface protrusion of the glass fiber.

The glass fiber included in the resin composition of one embodiment may be those surface-coated with a silane-based compound, and more particularly, those surface-coated with a compound having a urethane silane group or an epoxy silane group. For example, when the glass fiber is surface-coated with the compound having a urethane silane group, space between the urethane silane group and the polycarbonate resin is created to absorb external impacts. Consequently, the resin composition of one embodiment is able to exhibit more improved toughness, and furthermore, the glass fibers can stand in the resin composition and the molded article so as to inhibit modulus reduction due to the glass fiber. In contrast, when the glass fiber is surface-coated with the compound having an epoxy silane group, the epoxy group included therein forms a chemical bond with a functional group of other component so as to further improve stiffness of the resin composition and the molded article of one embodiment. Therefore, the glass fiber surface-coated with the urethane silane group or the epoxy silane group can be properly selected and used, considering the specific use of the resin composition of one embodiment and its physical properties to be improved.

As the silane-based compound, for example, as the compound having the epoxy silane group or the urethane silane group, any compound that has been typically used for surface coating of glass fibers can be used without limitation. Alternatively, a commercially available glass fiber that is surface-coated with the silane-based compound can be purchased and used as it is.

In the above described polycarbonate resin composition of one embodiment, the glass fiber can be included in an amount of approximately 30 to 55% by weight or approximately 41 to 55% by weight, based on the total resin composition.

As described above, although it is intended to further improve stiffness by addition of a higher content of the glass fiber than those known before to the polycarbonate resin composition of one embodiment, reduction in the surface smoothness and appearance property by protrusion of the excessive glass fiber during molding of the product can be prevented. Therefore, in response to the recent technical demands, it is possible to achieve additional improvement of the physical properties by addition of high content of the glass fiber. If the content of the glass fiber is too low, the resin composition and the molded article of one embodiment may have insufficient stiffness such as strength or the like, and higher stiffness owing to addition of high content of the glass fiber cannot be achieved, and thus it is difficult to satisfy the recent technical demands. In contrast, if the content of the glass fiber is too high, flowability of the resin composition is reduced and thus it is necessary to increase the process temperature. In addition, processability is reduced and thus it is difficult to achieve excellent impact resistance and good appearance property.

Impact Modifier of Core-Shell Structure

The impact modifier of the core-shell structure functions to enhance impact strength of the glass fiber-reinforced polycarbonate resin and to improve compression and warping resistance of plastic, thereby increasing dimensional stability. As the corresponding impact modifier, a silicone-acrylic-based rubber, a butadiene-based rubber, or an acrylic-based rubber having the core-shell structure can be used, and two or more selected therefrom can be also used.

As the impact modifier of the core-shell structure, any silicone-acrylic-based rubber, butadiene-based rubber, or acrylic-based rubber that has been known to be applicable to thermoplastic resin compositions can be used, and a commercial product such as SIM 100 (LG Chemical) widely known to those skilled in the art can be purchased and used without limitation.

The impact modifier of the core-shell structure can be included in an amount of approximately 1 to 10% by weight or approximately 2 to 6% by weight, based on the total resin composition. If the content of the impact modifier is too low, the resin composition or the molded article of one embodiment may have insufficient impact strength or warpage resistance. In contrast, if the content of the impact modifier is too high, the resin composition or the molded article of one embodiment may have insufficient stiffness such as strength or the like.

Ethylene-(Meth)Acrylate-Based Copolymer

The ethylene-(meth)acrylate-based copolymer is a component that is added to further improve flowability, moldability or the like of the resin composition of one embodiment. As the ethylene-(meth)acrylate-based copolymer, a copolymer of any (meth)acrylate and ethylene known to be applicable to the thermoplastic resin composition can be used without limitation.

Example of the commercial ethylene-(meth)acrylate-based copolymer may include Elvaloy 1330AC (DuPont) or the like.

The ethylene-(meth)acrylate-based copolymer may include approximately 15 to 50% by weight of (meth) acrylate-based repeating unit, based on the total weight of the copolymer. Specifically, this copolymer may be a copolymer of approximately 15 to 50% by weight of (meth) acrylate and the remaining amount of ethylene. As this ethylene-(meth)acrylate-based copolymer is used, flowability and moldability of the resin composition of one embodiment can be further improved, and reduction in the physical properties due to addition thereof can be inhibited. If the content of the (meth)acrylate-based repeating unit in the copolymer is too low, flowability of the resin composition is reduced, resulting in poor moldability or processability. In contrast, if the content of the (meth)acrylate-based repeating unit is too high, it is difficult to achieve sufficient physical properties such as toughness or the like of the resin composition and the molded article of one embodiment.

The above described ethylene-(meth)acrylate-based copolymer may be included in an amount of approximately 1 to 10% by weight or approximately 2 to 6% by weight, based on the resin composition. If the content of the copolymer is too low, the resin composition and the molded article of one embodiment may have insufficient toughness or the like. In contrast, if the content of the copolymer is too high, the resin composition and the molded article may have insufficient physical properties such as stiffness or the like.

Rheology Modifier

The rheology modifier is able to improve flowability of the resin composition of one embodiment, and also inhibit protrusion of the glass fiber on the surface of the resin composition and the molded article so as to further improve appearance property thereof. As the rheology modifier, a phosphate ester-based compound may be used, and examples of the phosphate ester-based compound may include triphenyl phosphate, bisphenol A diphenyl phosphate, resorcinol diphenyl phosphate or the like. Two or more selected therefrom can be used in combination. A variety of other phosphate ester-based compounds can be used as the rheology modifier.

The rheology modifier may be included in an amount of approximately 1 to 10% by weight or approximately 2 to 6% by weight, based on the total resin composition. If the content of the rheology modifier is too low, it is difficult to achieve excellent flowability, moldability or the like of the resin composition of one embodiment. In contrast, if the content of the rheology modifier is too high, the solidification rate of the polycarbonate resin is reduced to generate a problem in the product ejection during molding, and mechanical properties may be reduced.

Other Additives

The above described resin composition of one embodiment may further include additives such as a colorant, a lubricant, a UV stabilizer, an antioxidant, a coupling agent or the like, and can be used in various applications.

Meanwhile, according to another embodiment of the present invention, provided is a molded article including the above described polycarbonate resin composition of one embodiment. This molded article may be in a form, in which the above described glass fiber having the aspect ratio of approximately 50 to 200, the impact modifier of the core-shell structure, the ethylene-(meth)acrylate-based copolymer and the rheology modifier are uniformly dispersed in the resin matrix including the polycarbonate resin.

The molded article avoids the problems of the product that is obtained from the conventional glass fiber-reinforced polycarbonate resin composition, for example, flexure or deformation during molding of the product, or reduced surface smoothness and appearance property due to protrusion of the glass fiber. Also, the molded article is able to exhibit high stiffness, toughness or the like, and excellent flowability, product moldability or the like.

Accordingly, the molded article can be very preferably applied to housing of mobile telephones, housing of electrical•electronic products (particularly, small thin film electrical•electronic products), or housing of personal digital assistants, and also applied to other various products.

Advantageous Effects

The present invention prevents the problems of the conventional glass fiber-reinforced polycarbonate resin composition, for example, flexure or deformation during molding of the product, or reduced surface smoothness and appearance property due to protrusion of the glass fiber. Also, the polycarbonate resin composition and the molded article of the present invention are able to exhibit high stiffness, toughness or the like, and excellent flowability, product moldability or the like.

Accordingly, the resin composition and the molded article of the present invention can be very preferably applied to housing of mobile telephones, housing of electrical•electronic products (particularly, small thin film electrical•electronic products), or housing of personal digital assistants, and also applied to other various products.

MODE FOR INVENTION

The present invention will be described in more detail with reference to the following Examples. However, these Examples are for illustrative purposes only, and the present invention is not intended to be limited by these Examples.

Components used in Examples and Comparative Examples are as follows.

<(A) Bisphenol A Polycarbonate Resin (PC)>

A polycarbonate resin is a polymer of bisphenol A, and its melt index (MI) was determined as the weight (g) measured for 10 minutes at a temperature of 300° C. under a load of 1.2 kg in accordance with ASTM D1238. As a result of measurement, aromatic polycarbonate resins having the melt index of 10 g/10 min ((A)-1), 25 g/10 min ((A)-2), or 30 g/10 min ((A)-3) were used, respectively.

<(B)-1 Glass Fiber>

Glass fiber (manufactured by Nittobo) having a diameter (D) of 28 μm, a thickness of 7 μm, and a length of (L) 3 mm, and having the aspect ratio (δ) of 107, calculated by Formula 1, which was surface-treated with an epoxy silane-based compound, was used.

$$\text{Aspect ratio}(\delta) = L/D \qquad \text{[Formula 1]}$$

wherein L is the length of glass fiber, and D is the length of the longest side of the rectangular cross section or the length (e.g., diameter of glass fiber) of the longest diameter of the oval cross section.

<(B)-2 Glass Fiber>

Glass fiber (manufactured by Nittobo) having a diameter (D) of 20 μm, a thickness of 10 μm, and a length of (L) 3 mm, and having the aspect ratio (δ) of 150, calculated by Formula 1, which was surface-treated with an epoxy silane-based compound, was used.

<(B)-3 Glass Fiber>

Glass fiber (manufactured by Owens Corning) having a diameter (D) of 10~13 μm and a length of (L) 3 mm, and having the aspect ratio (δ) of 231~300, which was surface-treated with epoxy silane, was used.

<(C) Rheology Modifier—Phosphate Ester-Based Compound>

PX-200 manufactured by Daihachi (Japan) was used.

<(D) Impact Modifier of Core-Shell Structure>

A silicone-acrylic-based impact modifier having a core-shell structure composed of a silicone-acrylic-based rubber (S2001 manufactured by MRC) was used.

<(E) Ethylene-(Meth)Acrylate Copolymer>

Elvaloy 1330AC manufactured by DuPont was used.

<Thermoplastic Elastomer Polymer>

BT1055D manufactured by LG Chemical was used.

Physical properties of Examples and Comparative Examples were evaluated in accordance with the following test method.

Tensile Strength measured at room temperature using Instron UTM with a speed of 5 mm/sec in accordance with ASTM D638.

Flexural Strength and Flexural Modulus measured in accordance with ASTM D790.

Flexural Deflection measured in accordance with ASTM D790.

Impact Strength measured using a sample having a thickness of ⅛" at 23° C. in accordance with ASTM D256.

Flowability (Flow Index)

Flowability was evaluated by melt index (MI). This melt index (MI) was determined as the weight (g) measured for 10 minutes at a temperature of 300° C. under a load of 2.16 kg in accordance with ASTM D1238.

Surface Quality

Surface appearance of the molded article was generally evaluated by visual and tactile inspection and by an optical microscope from Grade 1 (good) to Grade 5 (poor). As a grade standard, appearance of a material without glass fiber was determined as Grade 1.

Examples 1 to 4

First, as shown in the following Table 1, each component was melted/mixed according to the content ratio at 290° C. in a twin screw extruder to prepare a pellet, and then a sample for the measurement of physical properties was prepared using an injector. Each sample was tested by the above test method, and then the results are shown in Table 2.

Comparative Examples 1 to 5

First, as shown in the following Table 1, each component was melted/mixed according to the content ratio at 290° C. in a twin screw extruder to prepare a pellet, and then a sample for the measurement of physical properties was prepared using an injector. Each sample was tested by the above test method, and then the results are shown in Table 2.

TABLE 1

| | | Examples | | | | Comparative Examples | | | | |
|---|---|---|---|---|---|---|---|---|---|---|
| | | 1 | 2 | 3 | 4 | 1 | 2 | 3 | 4 | 5 |
| A | 1 | 45 | — | 36 | 36 | 45 | — | 39 | 45 | 61 |
| | 2 | — | 45 | — | — | — | — | — | — | — |
| | 3 | — | — | — | — | — | 45 | — | — | — |
| B | 1 | 45 | 45 | 55 | — | — | — | — | 45 | 29 |
| | 2 | — | — | — | 55 | — | — | — | — | — |
| | 3 | — | — | — | — | 45 | 45 | 55 | — | — |
| C | | 4 | 4 | 3 | 3 | — | — | — | — | 4 |
| D | | 3 | 3 | 3 | 3 | 3 | 3 | 3 | 3 | 3 |
| E | | 3 | 3 | 3 | 3 | 3 | 3 | 3 | 3 | 3 |
| Thermoplastic elastomer | | — | — | — | — | — | — | — | 4 | — |

TABLE 2

| | Example | | | | Comparative Example | | | | |
|---|---|---|---|---|---|---|---|---|---|
| | 1 | 2 | 3 | 4 | 1 | 2 | 3 | 4 | 5 |
| Tensile strength (kg/cm$^2$) | 1500 | 1540 | 1730 | 1750 | 1320 | 1450 | 1560 | 1000 | 1050 |
| Flexural strength (kg/cm$^2$) | 2330 | 2450 | 2620 | 2720 | 2100 | 2180 | 2310 | 1800 | 1900 |
| Flexural modulus (Kg/cm$^2$) | 125000 | 135000 | 145000 | 140000 | 110000 | 115000 | 130000 | 110000 | 80000 |
| Flexural Deflection (mm) | 4.3 | 4.2 | 3.7 | 3.5 | 3.0 | 2.7 | 2.3 | 2 | 3.5 |
| Impact strength (kgcm/cm) | 13 | 13 | 13 | 13 | 10 | 8 | 9 | 5 | 16 |
| Melt index (g/10 min) | 13 | 16 | 9 | 9 | 6 | 12 | 5 | 25 | 14 |
| Appearance and Surface smoothness | 3 | 3 | 3 | 4 | 5 | 4 | 5 | 4 | 3 |

According to Table 2, it was found that the resin compositions of Examples 1 to 4 and the samples obtained therefrom exhibited excellent flowability, impact resistance and toughness, and also excellent surface appearance.

In contrast, it was found that the resin compositions of Comparative Examples 1 to 5 and the samples obtained therefrom exhibited lower strength, impact strength, flowability, and appearance property than those of Examples.

The invention claimed is:

1. A polycarbonate resin composition, comprising:

35 to 49% by weight of a polycarbonate resin, wherein the polycarbonate resin has melt index (MI) of 10 g/10 min to 25 g/10 min, which is measured at a temperature of 300° C. under a load of 1.2 kg in accordance with ASTM D128;

41 to 55% by weight of a glass fiber having a rectangular or oval cross-sectional shape in the direction perpendicular to the longitudinal direction, in which its aspect ratio of the following Formula 1 is 50 to 200;

1 to 10% by weight of an impact modifier having a core-shell structure;

1 to 10% by weight of an ethylene-(meth)acrylate-based copolymer; and 1 to 10% by weight of a rheology modifier containing a phosphate ester-based compound, Aspect ratio (δ)=L/D    [Formula 1]

wherein L is the length of a glass fiber, and D is the length of the longest side of the rectangular cross section or the length of the longest diameter of the oval cross section, wherein the phosphate ester-based compound includes resorcinol diphenyl phosphate, and wherein the impact modifier having a core-shell structure includes one or more selected from the group consisting of a silicone-acrylic-based rubber, a butadiene-based rubber, and an acrylic-based rubber.

2. The polycarbonate resin composition according to claim 1, wherein the glass fiber has a length of 2 to 5 mm and a rectangular cross section, and the length of its shortest side is 5 to 15 μm.

3. The polycarbonate resin composition according to claim 1, wherein the glass fiber has a length of 2 to 5 mm and an oval cross section, and the length of its shortest diameter is 5 to 15 μm.

4. The polycarbonate resin composition according to claim 1, wherein the glass fiber is surface-treated with a silane-based compound.

5. The polycarbonate resin composition according to claim 4, wherein the silane-based compound includes a compound having a urethane silane group or an epoxy silane group.

6. The polycarbonate resin composition according to claim 1, wherein the phosphate ester-based compound further includes one or more compounds selected from the group consisting of triphenyl phosphate and bisphenol A diphenyl phosphate.

7. The polycarbonate resin composition according to claim 1, wherein the resorcinol diphenyl phosphate includes resorcinol bis(di-2,6-xylyl)phosphate.

8. The polycarbonate resin composition according to claim 1, wherein the ethylene-(meth)acrylate-based copolymer includes 15 to 50% by weight of a (meth)acrylate-based repeating unit, based on the total weight of the copolymer.

9. A molded article comprising the polycarbonate resin composition of claim 1.

10. The molded article according to claim 9, wherein the glass fiber having the aspect ratio of 50 to 200, the impact modifier of the core-shell structure, the ethylene-(meth)acrylate-based copolymer and the rheology modifier are dispersed in a resin matrix including the polycarbonate resin.

11. The molded article according to claim 9, wherein the molded article is applied to housing of mobile telephones, housing of electrical•electronic products, or housing of personal digital assistants.

* * * * *